United States Patent
Sun et al.

(10) Patent No.: US 9,477,132 B2
(45) Date of Patent: Oct. 25, 2016

(54) METHOD FOR FORMING MICROCAPSULES FOR ELECTROPHORESIS DISPLAY

(71) Applicant: BOE TECHNOLOGY GROUP CO., LTD., Beijing (CN)

(72) Inventors: Wenwen Sun, Beijing (CN); Chuanxiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 503 days.

(21) Appl. No.: 13/703,528

(22) PCT Filed: Sep. 24, 2012

(86) PCT No.: PCT/CN2012/081857
§ 371 (c)(1),
(2) Date: Dec. 11, 2012

(87) PCT Pub. No.: WO2013/067863
PCT Pub. Date: May 16, 2013

(65) Prior Publication Data
US 2014/0103553 A1 Apr. 17, 2014

(30) Foreign Application Priority Data
Nov. 7, 2011 (CN) .......................... 2011 1 0347930

(51) Int. Cl.
*G02F 1/167* (2006.01)
*B01J 13/10* (2006.01)
*B01J 13/14* (2006.01)
*C09B 67/02* (2006.01)

(52) U.S. Cl.
CPC ................ *G02F 1/167* (2013.01); *B01J 13/10* (2013.01); *B01J 13/14* (2013.01); *C09B 67/0097* (2013.01); *G02F 2001/1678* (2013.01)

(58) Field of Classification Search
CPC ....................................................... G02F 1/167
See application file for complete search history.

(56) References Cited

U.S. PATENT DOCUMENTS 3,539,465 A * 11/1970 Heistand et al. .......... 428/402.2
3,965,033 A * 6/1976 Matsukawa et al. .......... 264/4.3
4,409,156 A * 10/1983 Hoshi et al. ................. 264/4.33
6,958,848 B2 10/2005 Cao et al.

(Continued)

FOREIGN PATENT DOCUMENTS

CN          1544141 A      11/2004
CN        101642694 A       2/2010

(Continued)

OTHER PUBLICATIONS

English translation of JP2008036417, 2008.*

(Continued)

*Primary Examiner* — Jeffrey Washville
(74) *Attorney, Agent, or Firm* — Ladas & Parry LLP

(57) ABSTRACT

An embodiment of the invention provides a method for forming microcapsules for electrophoresis display by forming microcapsules through a complex coacervation reaction between a sulfonated styrene maleic anhydride copolymer and gelatin, wherein a mass ratio of the sulfonated styrene maleic anhydride copolymer to the gelatin is 1:10~10:1. The method of the embodiment of the invention not only can obtain microcapsules with good sealability and stability, but also can obtain microcapsules having evenly distributed particle sizes and low cost.

13 Claims, 1 Drawing Sheet

(56) References Cited

U.S. PATENT DOCUMENTS

| | | | |
|---|---|---|---|
| 2004/0012839 A1* | 1/2004 | Cao et al. | 359/296 |
| 2004/0195711 A1* | 10/2004 | Hayashi et al. | 264/4.1 |
| 2005/0164116 A1* | 7/2005 | Wang et al. | 430/138 |
| 2005/0179983 A1* | 8/2005 | Sakai et al. | 359/296 |
| 2005/0270628 A1* | 12/2005 | Miyazaki et al. | 359/296 |
| 2006/0198422 A1* | 9/2006 | Chopra et al. | 374/158 |
| 2009/0153947 A1* | 6/2009 | Kurosawa | 359/296 |

FOREIGN PATENT DOCUMENTS

| | | | |
|---|---|---|---|
| CN | 102641704 A | | 8/2012 |
| JP | 200836417 | * | 2/2008 |

OTHER PUBLICATIONS

International Preliminary Report on Patentability dated May 13, 2014; PCT/CN2012/081857.

International Search Report mailed Jan. 3, 2013; PCT/CN2012/081857.

First Chinese Office Action dated Oct. 21, 2013; Appln, No. 201110347930.0.

Second Chinese Office Action dated Apr. 24, 2014; Appln. No. 201110347930.0.

Chinese Rejection Decision dated Jul. 30, 2014; Appln. No. 201110347930.0.

* cited by examiner

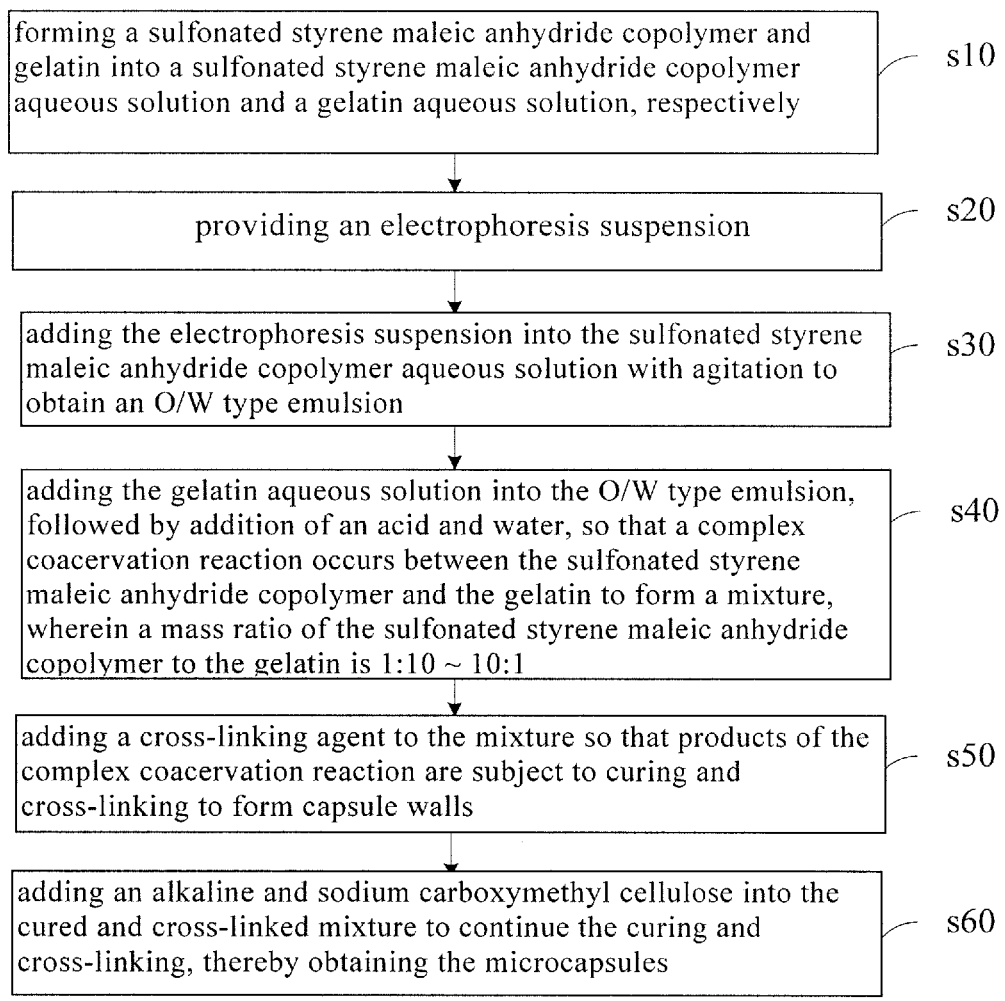

METHOD FOR FORMING MICROCAPSULES FOR ELECTROPHORESIS DISPLAY

TECHNICAL FIELD

An embodiment of the invention provides a method for forming microcapsules for electrophoresis display.

BACKGROUND

Microcapsule type electrophoresis display technique is a reflective display technique proposed on the basis of the electrophoresis phenomenon of charged particles suspended in a dispersion medium. The core of the microcapsule type electrophoresis technique lies in the microcapsules.

Traditional microcapsules include microcapsules based on gelatin-gum arabic. For such microcapsules, gelatin serves as the polycation, which is coagulated with the gum arabic serving as the polyanion in the aqueous phase and precipitated, followed by being attached to the capsule core droplets to form the capsule walls. However, the microcapsules formed by the traditional method have the following issues.

First, the gum arabic used in such microcapsules is prone to degradation during usage, resulting in poor stability of the capsule walls of the microcapsules, and the separation by the capsule wall is prone to decrease.

Second, the capsule wall of the microcapsules is thin; and the average diameter of the capsule formed is usually about 100 μm, resulting in poor sealability.

Third, the consistency of the process for forming microcapsules by using gum arabic is poor, resulting in unevenly distributed particle sizes of the microcapsules.

Fourth, the gum arabic is very expensive, resulting in high costs for forming the microcapsules.

SUMMARY

One of the technical problems to be solved by the invention is to provide a method for forming microcapsules for electrophoresis display, and the microcapsules formed by this method have good sealability and stability, and are cheap.

An embodiment of the invention provides a method for forming microcapsules for electrophoresis display comprising the steps of:

forming a sulfonated styrene maleic anhydride copolymer and gelatin into a sulfonated styrene maleic anhydride copolymer aqueous solution and a gelatin aqueous solution, respectively;

providing an electrophoresis suspension;

adding the electrophoresis suspension into the sulfonated styrene maleic anhydride copolymer aqueous solution with agitation to obtain an O/W type emulsion (that is, oil/water type emulsion);

adding the gelatin aqueous solution into the O/W type emulsion, followed by addition of an acid and water, so that a complex coacervation reaction occurs between the sulfonated styrene maleic anhydride copolymer and the gelatin to form a mixture, wherein a mass ratio of the sulfonated styrene maleic anhydride copolymer to the gelatin is 1:10~10:1;

adding a cross-linking agent to the mixture so that products of the complex coacervation reaction are subject to curing and cross-linking to form capsule walls; and adding an alkaline and sodium carboxymethyl cellulose into the cured and cross-linked mixture to continue the curing and cross-linking, thereby obtaining the microcapsules.

For example, the sulfonated styrene maleic anhydride copolymer accounts for 0.1~15% by weight percentage in the sulfonated styrene maleic anhydride copolymer aqueous solution.

For example, the gelatin accounts for 0.1~15% by weight percentage in the gelatin aqueous solution.

For example, the electrophoresis suspension is provided by: adding electrophoresis particles, a dye and an adjuvant into perchlorethylene; and subjecting the perchlorethylene, to which the electrophoresis particles, dye and adjuvant have been added, to ultrasound oscillation at the temperature of 30~70° C., thereby obtaining the electrophoresis suspension.

For example, the electrophoresis suspension forms electrophoresis particles having particle sizes of 100~300 nm in the O/W type emulsion.

For example, a mass ratio of the electrophoresis suspension to the sulfonated styrene maleic anhydride copolymer is 1~100:1.

For example, the acid is added into the O/W type emulsion so that the pH of the O/W type emulsion is adjusted to 4~5.

For example, the acid is one of hydrochloric acid, sulfuric acid, acetic acid, citric acid and tartaric acid, or a combination of at least two of them, and a mass concentration of the acid is 0.05~20%.

For example, the water that is added into the O/W type emulsion is water of 60~80° C., and the amount of the water added is 4~6 times the volume of the gelatin aqueous solution.

For example, the cross-linking agent is added after the mixture is cooled to 5~10° C., and the cross-linking agent is formaldehyde, glutaraldehyde, or a metal salt.

For example, a mass ratio of the cross-linking agent to the sulfonated styrene maleic anhydride copolymer is 1:5~10, and the curing and cross-linking reaction is conducted for 1~3 hours.

For example, the alkaline is added into the mixture, so that the pH of the mixture is adjusted to 9~11.

For example, a mass ratio of the sodium carboxymethyl cellulose added into the mixture to the sulfonated styrene maleic anhydride copolymer is 1:0.5~20.

For example, the curing and cross-linking reaction is continued at the temperature of 30~40° C. for 3~5 hours.

BRIEF DESCRIPTION OF THE DRAWINGS

In order to more clearly illustrate the technical solutions of the embodiments of the invention, the figures of the embodiments are briefly introduced below. Apparently, the figures in the following description merely concern some embodiments of the invention, rather than limit the invention.

FIG. 1 is a flow chart of a method for forming microcapsules for electrophoresis display according to an embodiment of the invention.

DETAILED DESCRIPTION

In order to enable a person skilled in the art to better understand the technical solutions of the embodiment of the invention, the method for forming microcapsules for electrophoresis display provided by the invention is described in details below in light of the figures. Apparently, the described embodiments are merely some rather than all embodiments of the invention. Any other embodiment obtainable by a person of ordinary skill in the art on the basis of the described embodiments of the invention, without resorting to creative labor, falls into the scope of the invention.

An embodiment of the invention provides a method for forming microcapsules for electrophoresis display, wherein the microcapsules thus formed include capsule walls and an electrophoresis suspension sealed within the capsule walls, and wherein the thickness of the capsule walls may be 150~200 μm, for example, 180 μm. Increase of the thickness of the capsule walls not only can increase the sealability of the microcapsules, but also can increase the stability of the microcapsules. The capsule walls are synthesized from a sulfonated styrene maleic anhydride copolymer and gelatin, so that the capsule walls comprise sulfonyl groups in the molecular structure, forming nonpermeable capsule walls similar to a multiple layer structure, and thereby further increasing the sealability and stability of the microcapsules. Moreover, the capsule walls containing sulfonyl group are hard to degrade, thereby increasing the stability of the microcapsules.

The sulfonated styrene maleic anhydride copolymer may be a polymer having a homogenous molecular weight distribution, or a mixture of polymers having two or more different molecular weight distributions.

For example, the number-average molecular weight of the sulfonated styrene maleic anhydride copolymer is 1000~100000. The mass ratio of the sulfonated styrene maleic anhydride copolymer to gelatin is, for example, 1:10~10:1.

The present embodiment provides microcapsules for electrophoresis display with capsule walls which have a thickness of 35~60 μm and a diameter of 150~200 μm. Thereby, the capsule walls not only can increase the sealability of the microcapsules, but also can reduce the influence of the external environment on the capsule core, thereby increasing the stability of the microcapsules.

FIG. 1 is the flow chart of a method for forming microcapsules for electrophoresis display according to an embodiment of the invention. Please refer to FIG. 1, the method for forming microcapsules for electrophoresis display provided by this embodiment includes the following steps.

Steps s10, a sulfonated styrene maleic anhydride copolymer and gelatin are formulated into a sulfonated styrene maleic anhydride copolymer aqueous solution and a gelatin aqueous solution, respectively.

In an embodiment, the sulfonated styrene maleic anhydride copolymer may be a polymer having a homogenous molecular weight distribution, or a mixture of polymers having two or more different molecular weight distributions. The number-average molecular weight of the sulfonated styrene maleic anhydride copolymer is 1000~100000.

The sulfonated styrene maleic anhydride copolymer are formulated with water of 40~70 centigrade (° C.) into a sulfonated styrene maleic anhydride copolymer aqueous solution having a mass concentration of 0.1~15%, and the pH of the sulfonated styrene maleic anhydride copolymer aqueous solution is adjusted to the range of 5.5~7.5.

The gelatin is dissolved in water having temperature of 40~70° C., to obtain a gelatin aqueous solution having a mass concentration of 0.1~15%, and the pH of the gelatin aqueous solution is adjusted to the range of 5.5~7.5.

Step s20, an electrophoresis suspension is provided. For example, a suspension comprising electrophoresis particles is prepared.

The electrophoresis suspension may be obtained in the following way. First, electrophoresis particles, a dye and an adjuvant are added into perchlorethylene; and the perchlorethylene, to which the electrophoresis particles, dye and adjuvant have been added, is subject to ultrasound oscillation at the temperature of 30~70° C. thereby obtaining the electrophoresis suspension. An example of the electrophoresis particles include titanium dioxide particles, or further include titanium dioxide particles that are modified with polyisobutylene succimide, the dosage may be for example 5-10 by weight percentage, and the titanium dioxide particles are white. The examples of the dye may include solvent green for green sub-pixel, and the dosage may be for example 10-15 by weight percentage; for red sub-pixels and blue sub-pixels, corresponding dyes can be elected.

In the embodiment, the adjuvant may include dispersing agents, charge control additives and/or molecular weight regulators and the like, according to need. The dispersing agents may be span-85, and the dosage may be for example 10-40 by weight percentage; the charge control additives may be span-80, and the dosage may be for example 1-5 by weight percentage. The examples of molecular weight regulators may include substances such as lauryl mercaptan or α-methylstyrene linear dimmer and the like. The prior art formulation method may be employed for the method for forming the electrophoresis suspension, and is not repeated in details here.

The method for preparing the electrophoresis suspension may be one that is in the prior art, and detailed description thereof is omitted here.

Step s30, the electrophoresis suspension is added into the sulfonated styrene maleic anhydride copolymer aqueous solution with agitation to obtain an oil/water type emulsion (O/W type emulsion).

The electrophoresis suspension obtained in step s20 is added into the sulfonated styrene maleic anhydride copolymer aqueous solution obtained in step s10 with simultaneous agitation to form an O/W type emulsion. The agitation may have a rate of 100~200 r/min and last for about 30~100 minutes, so that the electrophoresis suspension forms electrophoresis particles having particle sizes of 100~300 nm in the O/W type emulsion.

In step s30, a mass ratio of the electrophoresis suspension to the sulfonated styrene maleic anhydride copolymer is 1~100:1.

Step s40, the gelatin aqueous solution is added into the O/W type emulsion, followed by addition of an acid and water, so that a complex coacervation reaction occurs between the sulfonated styrene maleic anhydride copolymer and the gelatin to form a mixture.

Because the sulfonyl groups in the molecular structure of the sulfonated styrene maleic anhydride copolymer can bind to many gelatin cations, in step s40, the mass ratio of the sulfonated styrene maleic anhydride copolymer to the gelatin may be 1:10~10:1, for example, 1:2~10:1, preferably 1:4~10:1, thereby forming nonpermeable capsule walls with a high thickness, further enabling the increase of the sealability of the microcapsules. An acid is added upon the temperature of the O/W type emulsion drops to 30~60° C., so that the pH of the O/W type emulsion is adjusted to 4~5. The acid is one of hydrochloric acid, sulfuric acid, acetic acid, citric acid and tartaric acid, or a combination of at least two of them, and a mass concentration of the acid is 0.05~20%.

For example, the water added into the O/W type emulsion may be hot water of 60~80° C., and the water added is 4~6 times the volume of the gelatin aqueous solution.

Step s50, a cross-linking agent is added into the mixture so that products of the complex coacervation reaction are subject to curing and cross-linking to form capsule walls.

The mixture obtained in step s40 is kept in air so that it naturally cools to 5~10° C., and then the cross-linking agent is added for the curing and cross-linking reaction for 1~3 hours. The mass ratio of the cross-linking agent added to the sulfonated styrene maleic anhydride copolymer may be 1:5~10. The cross-linking agent may be formaldehyde, glutaraldehyde, or a metal salt, and the mass concentration of the cross-linking agent added may be 20~40%.

Step s60, an alkaline and sodium carboxymethyl cellulose are added into the cured and cross-linked mixture to continue the curing and cross-linking, thereby obtaining the microcapsules.

In step s60, sodium carboxymethyl cellulose having a mass concentration of 5~10% is further added into the mixture, and the mass ratio of the sodium carboxymethyl cellulose to the sulfonated styrene maleic anhydride copolymer is 1:0.5~20. An alkaline is added into the mixture, so that the pH of the mixture is adjusted to 9~11.

After the addition of sodium carboxymethyl cellulose into the mixture and the adjustment of its pH to the range of 9~11, the temperature of the mixture is adjusted to 30~40° C. to continue the curing and cross-linking reaction for 3~5 hours, thereby obtaining the microcapsules.

It should be noted that the order of step s10 and step 20 may be inversed, that is, first preparing the electrophoresis suspension, and then forming the sulfonated styrene maleic anhydride copolymer aqueous solution and the gelatin aqueous solution.

The method for forming microcapsules is introduced in details by way of specific examples.

Example 1 a. A sulfonated styrene maleic anhydride copolymer and gelatin are added into water with temperature of 40° C. to formulate a sulfonated styrene maleic anhydride copolymer aqueous solution having a mass concentration of 15% and a gelatin aqueous solution having a mass concentration of 15%, and the pH of the sulfonated styrene maleic anhydride copolymer aqueous solution and the gelatin aqueous solution are adjusted to 5.5.

b. Electrophoresis particles, a dye and an adjuvant are added into perchlorethylene, which is subject to ultrasound oscillation at the temperature of 30° C., thereby obtaining an electrophoresis suspension.

c. 50 g electrophoresis suspension is added into 300 g sulfonated styrene maleic anhydride copolymer aqueous solution with agitation to obtain an O/W type emulsion; subsequently the O/W type emulsion is agitated at the rate of 100 r/min for 30 minutes, so that the electrophoresis suspension formed electrophoresis particles having particle a size of 300 nm in the O/W type emulsion.

d. 3000 g gelatin aqueous solution with a mass concentration of 15% is added into the O/W type emulsion; after the temperature of the O/W type emulsion cools to 30° C., hydrochloric acid having a mass concentration of 0.05% is added so that the pH of the O/W type emulsion is adjusted to 4; subsequently, hot water with temperature of 60° C. is added into the O/W type emulsion, and the amount of water added is 4 times the volume of the gelatin aqueous solution.

e. The mixture is kept in air so that it naturally cools to 5° C., and then 50 g cross-linking agent with a mass concentration of 20% is added for curing and cross-linking reaction for 1 hour.

f. 10 g sodium carboxymethyl cellulose with a mass concentration of 5% is further added into the mixture, and an alkaline is added so that the pH of the mixture is adjusted to 9; and the temperature of the mixture is adjusted to 30° C. to continue the curing and cross-linking reaction for 3 hours, thereby obtaining the microcapsules.

Example 2 a. An sulfonated styrene maleic anhydride copolymer and gelatin are added into water with temperature of 50° C. to formulate a sulfonated styrene maleic anhydride copolymer aqueous solution having a mass concentration of 10% and a gelatin aqueous solution having a mass concentration of 10%, and the pH of the sulfonated styrene maleic anhydride copolymer aqueous solution and the gelatin aqueous solution are adjusted to 6.

b. Electrophoresis particles, a dye and an adjuvant are added into perchlorethylene, which is subject to ultrasound oscillation at the temperature of 40° C., thereby obtaining an electrophoresis suspension.

c. 50 g electrophoresis suspension is added into 50 g sulfonated styrene maleic anhydride copolymer aqueous solution with agitation to obtain an O/W type emulsion; subsequently the O/W type emulsion is agitated at the rate of 150 r/min for 50 minutes, so that the electrophoresis suspension formed electrophoresis particles having particle a size of 250 nm in the O/W type emulsion.

d. 250 g gelatin aqueous solution with a mass concentration of 10% is added into the O/W type emulsion; after the temperature of the O/W type emulsion cools to 40° C., hydrochloric acid having a mass concentration of 0.1% is added so that the pH of the O/W type emulsion is adjusted to 4.2; subsequently, hot water with temperature of 65° C. is added into the O/W type emulsion, and the amount of water added is 4.5 times the volume of the gelatin aqueous solution.

e. The mixture is kept in air so that it naturally cools to 6° C., and then 34 g cross-linking agent with a mass concentration of 25% is added for curing and cross-linking reaction for 1.5 hour.

f. 100 g sodium carboxymethyl cellulose with a mass concentration of 5% is further added into the mixture, and an alkaline is added so that the pH of the mixture is adjusted to 9.5; and the temperature of the mixture is adjusted to 40° C. to continue the curing and cross-linking reaction for 4 hours, thereby obtaining the microcapsules.

Example 3 a. An sulfonated styrene maleic anhydride copolymer and gelatin are added into water with temperature of 60° C. to formulate a sulfonated styrene maleic anhydride copolymer aqueous solution having a mass concentration of 5% and a gelatin aqueous solution having a mass concentration of 5%, and the pH of the sulfonated styrene maleic anhydride copolymer aqueous solution and the gelatin aqueous solution are adjusted to 7.

b. Electrophoresis particles, a dye and an adjuvant are added into perchlorethylene, which is subject to ultrasound oscillation at the temperature of 50° C., thereby obtaining an electrophoresis suspension.

c. 50 g electrophoresis suspension is added into 20 g sulfonated styrene maleic anhydride copolymer aqueous solution with agitation to obtain an O/W type emulsion; subsequently the O/W type emulsion is agitated at the rate of 200 r/min for 70 minutes, so that the electrophoresis suspension formed electrophoresis particles having particle a size of 200 nm in the O/W type emulsion.

d. 200 g gelatin aqueous solution with a mass concentration of 5% is added into the O/W type emulsion; after the temperature of the O/W type emulsion cools to 50° C., hydrochloric acid having a mass concentration of 1% is added so that the pH of the O/W type emulsion is adjusted to 4.5; subsequently, hot water with temperature of 70° C. is added into the O/W type emulsion, and the amount of water added is 5 times the volume of the gelatin aqueous solution.

e. The mixture is kept in air so that it naturally cools to 7° C., and then 0.5 g cross-linking agent with a mass concentration of 30% is added for curing and cross-linking reaction for 2 hours.

f. 4 g sodium carboxymethyl cellulose with a mass concentration of 5% is further added into the mixture, and an alkaline is added so that the pH of the mixture is adjusted to 10; and the temperature of the mixture is adjusted to 40° C. to continue the curing and cross-linking reaction for 5 hours, thereby obtaining the microcapsules.

Example 4 a. An sulfonated styrene maleic anhydride copolymer and gelatin are added into water with temperature of 70° C. to formulate a sulfonated styrene maleic anhydride copolymer aqueous solution having a mass concentration of 1% and a gelatin aqueous solution having a mass concentration of 1%, and the pH of the sulfonated styrene maleic anhydride copolymer aqueous solution and the gelatin aqueous solution are adjusted to 7.5.

b. Electrophoresis particles, a dye and an adjuvant are added into perchlorethylene, which is subject to ultrasound oscillation at the temperature of 60° C., thereby obtaining an electrophoresis suspension.

c. 50 g electrophoresis suspension is added into 50 g sulfonated styrene maleic anhydride copolymer aqueous solution with agitation to obtain an O/W type emulsion; subsequently the O/W type emulsion is agitated at the rate of 180 r/min for 80 minutes, so that the electrophoresis suspension formed electrophoresis particles having particle a size of 100 nm in the O/W type emulsion.

d. 50 g gelatin aqueous solution with a mass concentration of 1% is added into the O/W type emulsion; after the temperature of the O/W type emulsion cools to 60° C., hydrochloric acid having a mass concentration of 5% is added so that the pH of the O/W type emulsion is adjusted to 5; subsequently, hot water with temperature of 80° C. is added into the O/W type emulsion, and the amount of water added is 6 times the volume of the gelatin aqueous solution.

e. The mixture is kept in air so that it naturally cools to 8° C., and then 0.15 g cross-linking agent with a mass concentration of 40% is added for curing and cross-linking reaction for 3 hours.

f. 0.5 g sodium carboxymethyl cellulose with a mass concentration of 10% is further added into the mixture, and an alkaline is added so that the pH of the mixture is adjusted to 11; and the temperature of the mixture is adjusted to 35° C. to continue the curing and cross-linking reaction for 4.8 hours, thereby obtaining the microcapsules.

Example 5 a. An sulfonated styrene maleic anhydride copolymer and gelatin are added into water with temperature of 70° C. to formulate a sulfonated styrene maleic anhydride copolymer aqueous solution having a mass concentration of 0.1% and a gelatin aqueous solution having a mass concentration of 0.1%, and the pH of the sulfonated styrene maleic anhydride copolymer aqueous solution and the gelatin aqueous solution are adjusted to 5.5.

b. Electrophoresis particles, a dye and an adjuvant are added into perchlorethylene, which is subject to ultrasound oscillation at the temperature of 70° C., thereby obtaining an electrophoresis suspension.

c. 80 g electrophoresis suspension is added into 1000 g sulfonated styrene maleic anhydride copolymer aqueous solution with agitation to obtain an O/W type emulsion; subsequently the O/W type emulsion is agitated at the rate of 200 r/min for 100 minutes, so that the electrophoresis suspension formed electrophoresis particles having particle a size of 100 nm in the O/W type emulsion.

d. 5000 g gelatin aqueous solution with a mass concentration of 0.1% is added into the O/W type emulsion; after the temperature of the O/W type emulsion cools to 80° C., hydrochloric acid having a mass concentration of 20% is added so that the pH of the O/W type emulsion is adjusted to 6; subsequently, hot water with temperature of 80° C. is added into the O/W type emulsion, and the amount of water added is 6 times the volume of the gelatin aqueous solution.

e. The mixture is kept in air so that it naturally cools to 10° C., and then 0.5 g cross-linking agent with a mass concentration of 20% is added for curing and cross-linking reaction for 3 hours.

f. 1 g sodium carboxymethyl cellulose with a mass concentration of 5% is further added into the mixture, and an alkaline is added so that the pH of the mixture is adjusted to 11; and the temperature of the mixture is adjusted to 35° C. to continue the curing and cross-linking reaction for 4.2 hours, thereby obtaining the microcapsules.

Example 6 a. An sulfonated styrene maleic anhydride copolymer and gelatin are added into water with temperature of 70° C. to formulate a sulfonated styrene maleic anhydride copolymer aqueous solution having a mass concentration of 8% and a gelatin aqueous solution having a mass concentration of 8%, and the pH of the sulfonated styrene maleic anhydride copolymer aqueous solution and the gelatin aqueous solution are adjusted to 6.

b. Electrophoresis particles, a dye and an adjuvant are added into perchlorethylene, which is subject to ultrasound oscillation at the temperature of 70° C., thereby obtaining an electrophoresis suspension.

c. 80 g electrophoresis suspension is added into 50 g sulfonated styrene maleic anhydride copolymer aqueous solution with agitation to obtain an O/W type emulsion; subsequently the O/W type emulsion is agitated at the rate of 200 r/min for 100 minutes, so that the electrophoresis suspension formed electrophoresis particles having particle a size of 120 nm in the O/W type emulsion.

d. 500 g gelatin aqueous solution with a mass concentration of 8% is added into the O/W type emulsion; after the temperature of the O/W type emulsion cools to 80° C., hydrochloric acid having a mass concentration of 20% is added so that the pH of the O/W type emulsion is adjusted to 6; subsequently, hot water with temperature of 80° C. is added into the O/W type emulsion, and the amount of water added is 6 times the volume of the gelatin aqueous solution.

e. The mixture is kept in air so that it naturally cools to 10° C., and then 0.5 g cross-linking agent with a mass concentration of 20% is added for curing and cross-linking reaction for 3 hours.

f. 1 g sodium carboxymethyl cellulose with a mass concentration of 5% is further added into the mixture, and an alkaline is added so that the pH of the mixture is adjusted to 11; and the temperature of the mixture is adjusted to 40° C. to continue the curing and cross-linking reaction for 4.2 hours, thereby obtaining the microcapsules.

In the method for forming microcapsules for electrophoresis provided in the embodiments, the capsule walls of the microcapsules are obtained from the sulfonated styrene maleic anhydride copolymer and gelatin. Because the hydrolyte of the sulfonated styrene maleic anhydride copolymer has the characteristics of surfactants, it can emulsify the electrophoresis suspension dispersed in the aqueous phase and make the particle sizes of the electrophoresis suspension evenly distributed, so that microcapsules with a homogenous particle size can be obtained. The average diameter of the microcapsules may reach 150~200 μm, and the thickness of the capsule walls is 35~60 μm. Moreover, the sulfonyl groups in the molecular structure of the sulfonated styrene maleic anhydride copolymer can bind to many gelatin cations, thereby forming nonpermeable capsule walls with a high thickness, further enabling the increase of the sealability of the microcapsules. The increase of the thickness of capsule thickness can also reduce the influence of the external environment on the capsule core, thereby increasing the stability of the microcapsules. Moreover, the sulfonated styrene maleic anhydride copolymer is not prone to degradation, thereby further increasing the stability of the microcapsules; and because it is cheap, the costs for the microcapsules can be reduced.

To those skilled in the art, various changes and improvements may be made without departing from the spirits and essence of the invention, and these changes and improvements are also considered as within the scope of protection of the invention.

The invention claimed is:

1. A method for forming an electrophoresis display comprising:
    forming a sulfonated styrene maleic anhydride copolymer and gelatin into a sulfonated styrene maleic anhydride copolymer aqueous solution and a gelatin aqueous solution, respectively;
    providing an electrophoresis suspension;
    adding the electrophoresis suspension into the sulfonated styrene maleic anhydride copolymer aqueous solution with agitation to obtain an O/W type emulsion;
    adding the gelatin aqueous solution into the O/W type emulsion, followed by addition of an acid and water, so that a complex coacervation reaction occurs between the sulfonated styrene maleic anhydride copolymer and the gelatin to form a mixture, wherein a mass ratio of the sulfonated styrene maleic anhydride copolymer to the gelatin is from 1:10 to 10:1;
    adding a cross-linking agent to the mixture so that products of the complex coacervation reaction are subject to curing and cross-linking to form capsule walls;
    adding an alkaline and sodium carboxymethyl cellulose into the cured and cross-linked mixture to continue the curing and cross-linking, thereby obtaining the microcapsules; and
    forming an electrophoresis display with the obtained microcapsules;
    wherein providing the electrophoresis suspension comprises:
    adding electrophoresis particles, a dye and an adjuvant into perchlorethylene; and
    subjecting the perchlorethylene, to which the electrophoresis particles, dye and adjuvant have been added to, ultrasound oscillation at the temperature of from 30 to 70° C., thereby obtaining the electrophoresis suspension.

2. The method according to claim 1, wherein the sulfonated styrene maleic anhydride copolymer accounts for from 0.1% to 15% by weight percentage in the sulfonated styrene maleic anhydride copolymer aqueous solution.

3. The method according to claim 1, wherein the gelatin accounts for from 0.1% to 15% by weight percentage in the gelatin aqueous solution.

4. The method according to claim 1, wherein the electrophoresis suspension forms electrophoresis particles having particle sizes of from 100 to 300 nm in the O/W type emulsion.

5. The method according to claim 1, wherein a mass ratio of the electrophoresis suspension to the sulfonated styrene maleic anhydride copolymer is from 1:1 to 100:1.

6. The method according to claim 1, wherein the acid is added into the O/W type emulsion so that the pH of the O/W type emulsion is adjusted to from 4 to 5.

7. The method according to claim 1, wherein the acid is one of hydrochloric acid, sulfuric acid, acetic acid, citric acid and tartaric acid, or a combination of at least two of them, and a mass concentration of the acid is from 0.05% to 20%.

8. The method according to claim 1, wherein the water that is added into the O/W type emulsion is water of from 60 to 80° C., and the amount of the water added is from 4 to 6 times the volume of the gelatin aqueous solution.

9. The method according to claim 1, wherein the cross-linking agent is added after the mixture is cooled to from 5 to 10° C., and the cross-linking agent is formaldehyde, glutaraldehyde, or a metal salt.

10. The method according to claim 9, wherein a mass ratio of the cross-linking agent to the sulfonated styrene maleic anhydride copolymer is from 1:5 to 1:10, and the curing and cross-linking reaction is conducted for from 1 to 3 hours.

11. The method according to claim 1, wherein the alkaline is added into the mixture so that the pH of the mixture is adjusted to from 9 to 11.

12. The method according to claim 11, wherein a mass ratio of the sodium carboxymethyl cellulose added into the mixture to the sulfonated styrene maleic anhydride copolymer is from 1:0.5 to 1:20.

13. The method according to claim 12, wherein the curing and cross-linking reaction is continued at the temperature of from 30 to 40° C. for from 3 to 5 hours.

* * * * *